(12) United States Patent
Hermsmeyer et al.

(10) Patent No.: US 8,763,062 B2
(45) Date of Patent: Jun. 24, 2014

(54) METHOD AND APPARATUS FOR CONTROLLING INFORMATION AVAILABLE FROM CONTENT DISTRIBUTION POINTS

(75) Inventors: Christian Thomas Hermsmeyer, Eckental (DE); Dieter Stoll, Erlangen (DE); Wolfgang Thomas, Nuremberg (DE)

(73) Assignee: Alcatel Lucent, Paris (FR)

( * ) Notice: Subject to any disclaimer, the term of this patent is extended or adjusted under 35 U.S.C. 154(b) by 1191 days.

(21) Appl. No.: 11/554,122

(22) Filed: Oct. 30, 2006

(65) Prior Publication Data
US 2008/0115167 A1 May 15, 2008

(51) Int. Cl.
*H04N 21/20* (2011.01)
*H04N 21/266* (2011.01)

(52) U.S. Cl.
USPC .......................................... 725/118; 725/119

(58) Field of Classification Search
USPC .................. 725/118, 114–116, 119, 120, 138, 725/144–147, 9, 14
See application file for complete search history.

(56) References Cited

U.S. PATENT DOCUMENTS

| | | | |
|---|---|---|---|
| 5,488,412 A * | 1/1996 | Majeti et al. | 725/111 |
| 6,366,761 B1 * | 4/2002 | Montpetit | 455/12.1 |
| 6,466,980 B1 | 10/2002 | Lumelsky et al. | |
| 2002/0133589 A1 | 9/2002 | Gubbi et al. | |
| 2003/0236854 A1 * | 12/2003 | Rom et al. | 709/217 |
| 2007/0116048 A1 * | 5/2007 | Addington | 370/468 |
| 2007/0143808 A1 * | 6/2007 | Agrawal et al. | 725/119 |
| 2007/0261072 A1 * | 11/2007 | Boulet et al. | 725/14 |
| 2008/0046912 A1 * | 2/2008 | Gemelos et al. | 725/14 |
| 2009/0168797 A1 * | 7/2009 | Danielson et al. | 370/458 |

FOREIGN PATENT DOCUMENTS

| | | |
|---|---|---|
| CN | 1361962 A | 7/2002 |
| WO | WO 01/06710 A1 | 1/2001 |
| WO | PCT/US2007/021903 | 6/2008 |

OTHER PUBLICATIONS

Aioffi W M et al: "Dynamic Content Distribution for Mobile Enterprise Networks" IEEE Journal on Selected Areas in Communications, IEEE Service Center, Piscataway, US, vol. 23, No. 10, Oct. 1, 2005, pp. 2022-2031, XP011140069 ISSN: 0733-8716 abstract p. 2025.

(Continued)

*Primary Examiner* — Benjamin R Bruckart
*Assistant Examiner* — Jason Thomas
(74) *Attorney, Agent, or Firm* — Wall & Tong, LLP

(57) ABSTRACT

The invention includes a method and apparatus for controlling information available at a network element located at a first hierarchical level in a content distribution network. A method includes determining a subset of content using content forecast information, comparing the determined subset of content to a subset of content available to the network element located at the first hierarchical level, generating a request adapted for modifying the available subset of content in response to a difference between the determined and available subsets of content, and propagating the request toward a network element at a second hierarchical level in the content distribution network, where the first and second hierarchical levels are different. The content may include any information adapted for being distributed from a server to a subscriber terminal (e.g., broadcast multimedia content, content-on-demand, non-streaming content such as files and software patches, and the like, as well as various combinations thereof).

24 Claims, 4 Drawing Sheets

(56) References Cited

OTHER PUBLICATIONS

Bo, Li et al: "Prediction Algorithms in Large Scale VOD Network Collaborations" Computational Intelligence and Bioinformatics Lecture Notes in Computer Science; Lecture Notes in Bioinformatics LNCS, Springer Berlin Heidelberg, BE, vol. 4115, Jan. 1, 2006, pp. 682-692, XP019038418 ISBN: 978-3-540-37277-6 p. 683-p. 690.

Lo Presti F et al: "Dynamic Replica Placement in Content Delivery Networks" Modeling, Analysis, and Simulation of Computer and Telecommunication Systems, 2005, 13th IEEE International Symposium on Atlanta, GA, USA Sep. 27-29, 2005, Piscataway, NJ, USA, IEEE, Sep. 27, 2005, pp. 1-10, XP010843617 ISBN: 978-0-7695-2458-0 p. 3-p. 6.

Bo Li et al., "Prediction Algorithms in Large Scale VOD Network Collaborations," Computational Intelligence and Bioinformatics Lecture Notes in Computer Science, vol. 4115, pp. 682-692.

Jan. 6, 2012 Office Action in CN 2007800402258, Lucent Technologies Inc., Applicant, 4 pages.

* cited by examiner

100

200

METHOD AND APPARATUS FOR CONTROLLING INFORMATION AVAILABLE FROM CONTENT DISTRIBUTION POINTS

FIELD OF THE INVENTION

The invention relates to the field of communication networks and, more specifically, to content distribution networks.

BACKGROUND OF THE INVENTION

Internet Protocol (IP) Television (IPTV) is a technology that distributes video content to subscribers by transporting video content using IP data streams over a packet distribution network. The content data streams of an IPTV distribution network, which may include a variety of TV channels, on-demand movies, and other content, are streamed from video servers toward the subscribers. The video content data streams are transported over one or more network elements (which may operate as channel selection points) between the video servers and the subscribers. In IPTV distribution networks, the video servers and channel selection points are typically arranged in a hierarchical manner, with video servers at the top of the hierarchy and subscribers at the bottom of the hierarchy, and one or more levels of channel selection points between the video servers and subscribers.

In IPTV distribution networks, in order to request a particular channel available from a video server, a subscriber initiates a channel request to a channel selection point, beginning with the channel selection point closest to the subscriber location. If the channel selection point closest to the subscriber location cannot serve the request (i.e., the channel is not available at that channel selection point), that channel selection point forwards the subscriber request upstream in the hierarchy of the network elements of the IPTV distribution network (i.e., toward the video server). The channel request from the subscriber continues to be forwarded upstream until reaching a network element (i.e., another channel selection point or a video server) that is able to serve the request. The network element serving the request streams the requested channel to the subscriber.

IPTV distribution over provider networks attempts to bring a full range of IPTV channels from a video server that is the source of the IPTV channels to a channel selection point that is as close as possible to the subscriber locations. Since IPTV distribution networks are typically hierarchical networks, the closer the channel selection point (from which a subscriber request for a television channel is served) is to a video server from which the requested television channel is available, the more problematic the IPTV distribution network becomes.

First, since IPTV distribution networks typically include multiple hierarchical levels, and the number of channel selection points at the different hierarchical levels increases in the direction from video server to subscribers, channel selection points closer to the video servers typically require higher bandwidth than channel selection points closer to the subscribers (i.e., the channel selection points closer to the video servers support more television channels than the channel selection points closer to the subscriber because the active television channels accumulate toward the video server). Due to economic reasons, IPTV distribution network operators cannot afford the link capacities required in order to deliver all available channels from the video server to the numerous channel selection points lower in the hierarchy Second, for a channel selection request served by a channel selection point farther from a subscriber, the signaling delay between the subscriber and the channel selection point increases, typically resulting in unacceptable channel switching performance. Furthermore, this unacceptable channel switching performance may, in turn, encourage the subscriber to continue to issue requests for other channels before the previous channel requests have been completed. These additional requests for other channels that are issued before the previous channel requests have been server further exacerbate the channel switching performance problems.

Disadvantageously, channel selection points are currently devoid of any intelligence regarding which channels should be available from the channel selection points. As a result, channel requests often cannot be served by the channel selection point closest to the associated subscriber, thereby resulting in increased reaction times required by the network in order to react to channel selections, inefficient channel replacements (i.e., inefficiency in selecting which channel to drop if multiple channels are provided to the subscriber), significant increases in signaling overhead, and other problems which result as channel selection points from which subscribers are served move away from the subscriber locations.

SUMMARY OF THE INVENTION

Various deficiencies in the prior art are addressed through the invention of a method and apparatus for controlling information available at a network element in a hierarchical network. The information may include any information which may be distributed from a server to subscriber terminal, including full streaming media content streamed from a server to subscribers (e.g., IPTV broadcast multimedia content, broadcast audio content, and the like), partial streaming media content distributed from a server to subscribers using one or more network buffers for controlling timing of delivery of the media content to the subscribers (e.g., IPTV video-on-demand (VOD) content, audio-on-demand content, and the like), non-streaming information (e.g., data files, software patches, and the like), and the like, as well as various combinations thereof.

A method is provided for controlling information available at a network element located at a first hierarchical level in an information distribution network. In one embodiment, the method includes determining a subset of content using content forecast information, comparing the determined subset of content to a subset of content available to the network element located at the first hierarchical level, generating a request adapted for modifying the available subset of content where the request is generated in response to a difference between the determined and available subsets of content, and propagating the generated request toward a network element at a second hierarchical level in the content distribution network, where the first and second hierarchical levels are different. As described herein, the determined and available subsets of content may include any information, such as content channels, content objects, and the like (which may be more generally referred to herein as content items), depending on the context in which the present invention is employed.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although primary depicted and described herein within the context of an IPTV distribution network providing IPTV broadcast television channels from content servers to subscriber terminals, as described herein, the present invention may be used for controlling distribution and availability of numerous other types of information from a network element in a hierarchical network (e.g., streaming audio content, video-on-demand content, data files, software patches, and the like, as well as various combinations thereof). In other words, the varied capabilities of the present invention described herein with respect to streaming broadcast television channels may be equally applied within the context of hierarchical networks distributing such other information, thereby controlling the availability and distribution of such other information available from a network element in the hierarchical network.

Figure 1:
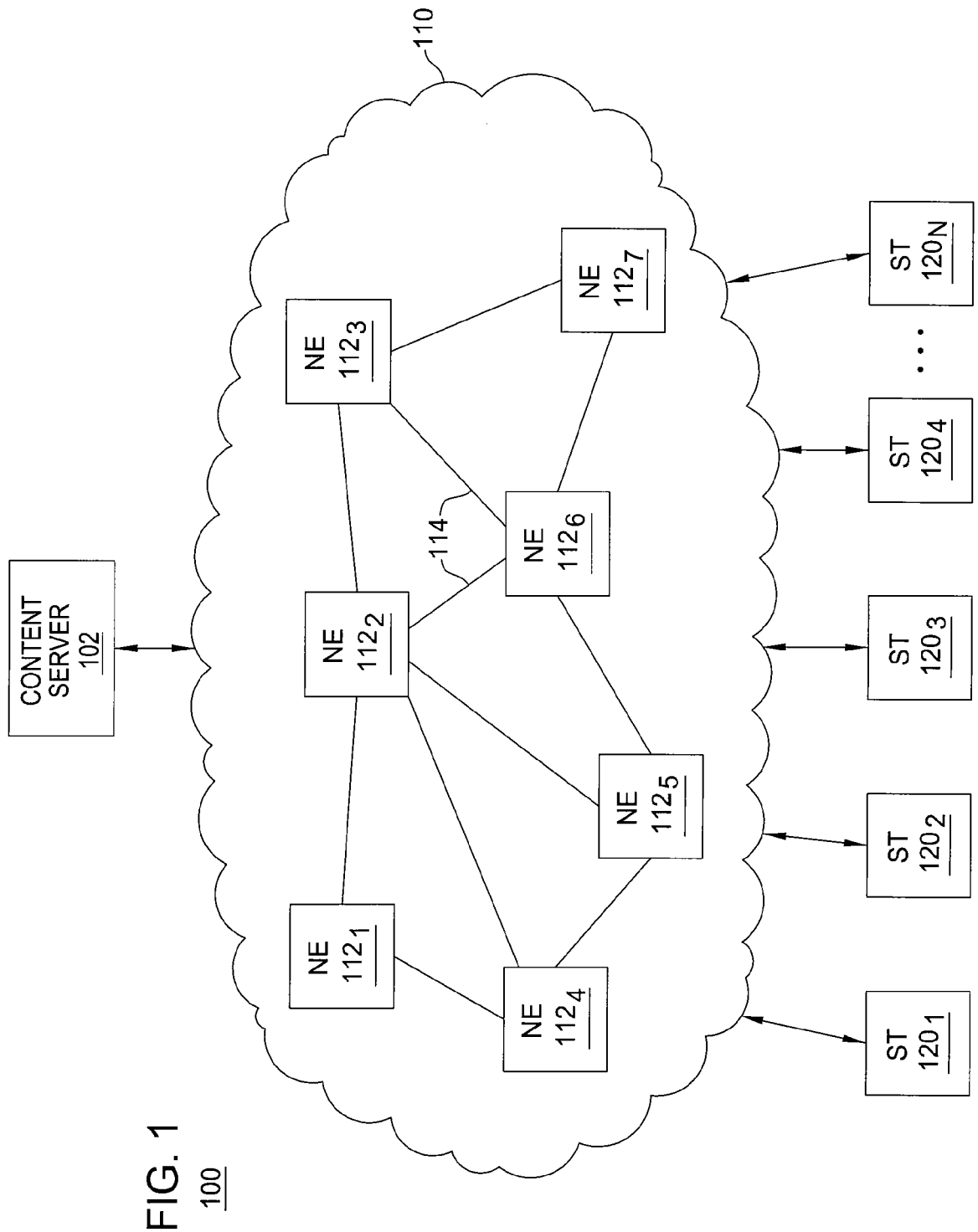
FIG. 1 depicts a high-level block diagram of a communication network.

FIG. 1 depicts a high-level block diagram of a communication network. Specifically, communication network 100 of FIG. 1 includes a content server (CS) 102, a content distribution network (CDN) 110, and a plurality of subscriber terminals (STs) $120_1$-$120_N$ (collectively, STs 120). The CDN 110 includes a plurality of network elements (NEs) $112_1$-$112_7$ (collectively, NEs 112) in communication using a plurality of communication links (CLs) 114 (collectively, CLs 114). Although primarily depicted and described with respect to specific numbers and configurations of content servers, network elements, and subscriber terminals, the present invention may utilize other numbers and configurations of content servers, network elements, and subscriber terminals.

The CS 102 includes any server adapted to provide content to STs 120 over CDN 110. In one embodiment, CS 102 provides content to STs 120 as content streams (which may be referred to as content channels) via network elements in CDN 100 (illustratively, NEs 112). In one such embodiment, CS 102 may provide content over content channels by forming one or more multicast trees adapted to stream content of the content channels to STs 120. In one embodiment, CS 120 provides content to network elements in CDN 100 (illustratively, NEs 112) which may buffer/store the content for distribution to STs 120. The content provided by CS 102 may include any content that may be provided to STs 120 over CDN 110, such as data, audio, video, and the like, as well as various combinations thereof. For example, in one embodiment, in which CS 102 is a video server in an IPTV network, CS 102 streams broadcast videos associated with respective television channels.

The STs 120 are adapted for receiving, processing, and, optionally, presenting content received from CDN 110. The STs 120 are further adapted for initiating requests for information (e.g., for content channels, VOD videos, software patches, and the like) to NEs 112 in CDN 110. For example, in an IPTV distribution network, STs 120 may initiate a channel change operation between television channels (e.g., from CBS to NBC). For example, STs 120 include computers, televisions, and the like, as well as various components associated with such subscriber terminals (such as a mouse, monitor and the like for a computer, a remote control, settop box, and the like for a television, and the like, as well as various combinations thereof). The STs 120 may include various other subscriber devices adapted for requesting, processing, and, optionally, presenting content received from a hierarchical content distribution network.

The CDN 110 includes a network adapted for distributing content from a content server (illustratively, CS 102) to subscriber terminals (illustratively, STs 120). The NEs 112 include any network elements adapted for facilitating distribution of content from CS 102 to STs 120. For example, NEs 112 may include routers, time division multiplexing switches, optical switches, and like network elements, as well as various combinations thereof. Similarly, CLs 114 may include any communication links adapted for conveying content between NEs 112. The NEs 112 operate as content selection points (and may be more specifically referred to herein as channel selection points because the present invention is primarily depicted and described within the context of an IPTV broadcast network) operable for serving requests from STs 120 for content available from CS 102.

Figure 2:
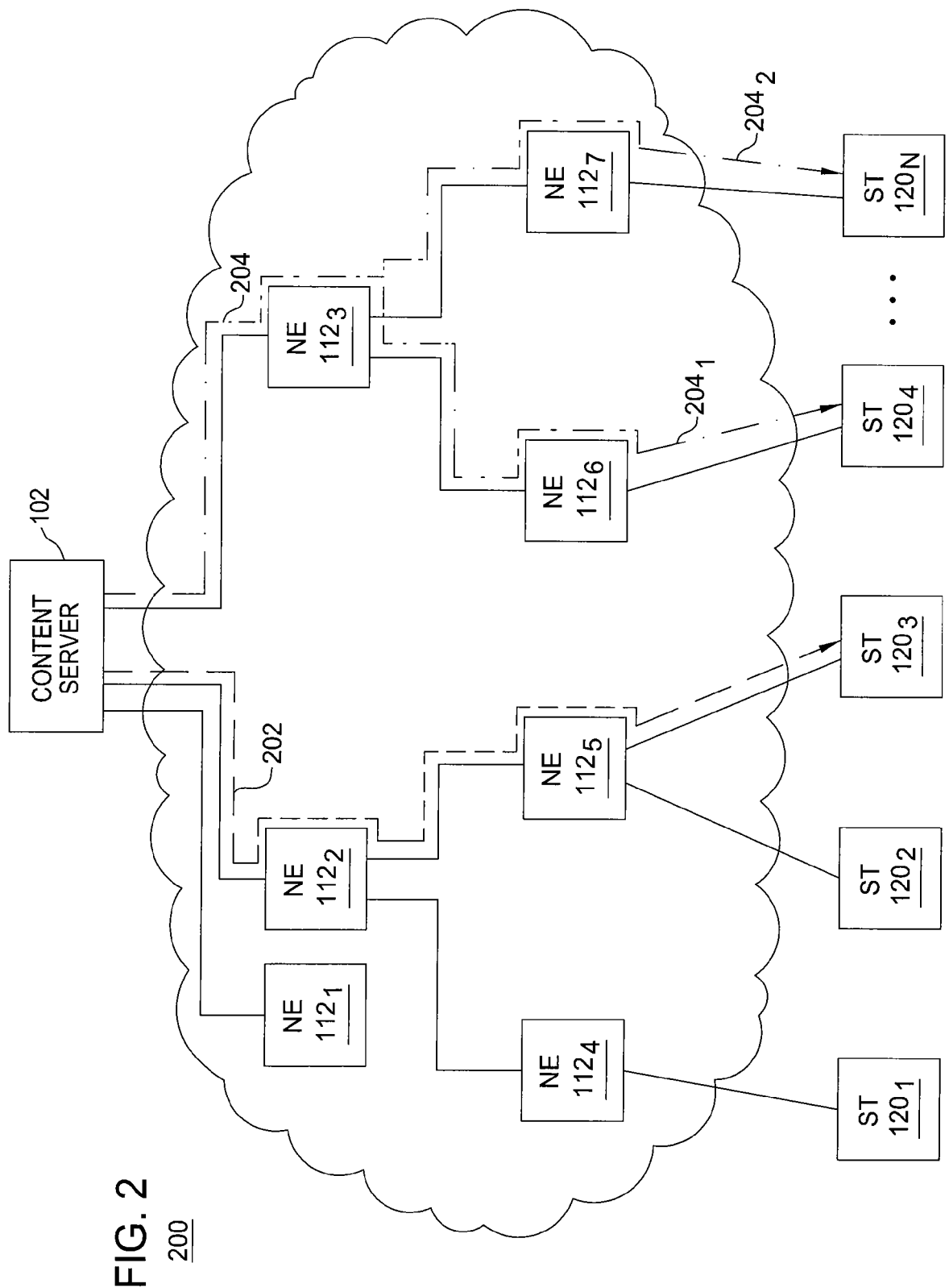
FIG. 2 depicts a high-level block diagram of the communication network of FIG. 1 including content distribution (illustratively, distribution of broadcast video streams) from a content server to subscriber terminals.

In one embodiment, as depicted and described herein with respect to FIG. 2, NEs 112 may be configured hierarchically with respect to distribution of content from CS 102 to STs 120. The operation of communication network 100 of FIG. 1 as a hierarchical content distribution network may be better understood with respect to FIG. 2. Furthermore, in accordance with the present invention, NEs 112 collect content forecast information (which may be more specifically referred to herein as channel forecast information because the present invention is primarily depicted and described within the context of an IPTV broadcast network) and modify the content available from NEs 112 using the content forecast information. The operation of one of NEs 112 in obtaining forecast information, as well as using the forecast information to optimize the content available from the NE 112, may be better understood with respect to FIG. 3.

FIG. 2 depicts a high-level block diagram of a communication network (illustratively, communication network 100 of FIG. 1) configured to operate as a hierarchical network for distributing content channels from a content server (illustratively, CS 102) to channel selection points (illustratively, the NEs 112). Although depicted and described herein with respect to a hierarchical network distributing content channels (e.g., streaming IPTV broadcast streams), a hierarchical network in accordance with the present invention may distribute various other types of information (e.g., VOD videos, data files, software patches, and the like, as well as various combinations thereof), as described herein.

As depicted in FIG. 2, hierarchical content distribution network 200 is arranged as a tree hierarchy with CS 102 forming the root of the tree and STs 102 forming leaves of the tree. The CS 102 is coupled to NE $112_1$. The CS 102 is coupled to NE $112_2$, which is coupled to NEs $112_4$ and $112_5$. The NE $112_4$ is coupled to ST $120_1$. The NE $112_5$ is coupled to STs $120_2$ and $120_3$. The CS 102 is coupled to NE $112_3$, which is coupled to NEs $112_6$ and $112_7$. The NE $112_6$ is coupled to ST $120_4$. The NE $112_7$ is coupled to ST $120_N$. The NEs 112 are disposed at various hierarchical levels. For purposes of clarity in describing the present invention, CS 102 may be considered to be at the highest hierarchical level, while STs 120 may be considered to be at the lowest hierarchical level. Similarly, a first NE 112 closer to CS 102 than a second NE 112 (i.e., in terms of number of hops) may be considered to be at a higher hierarchical layer than the second NE 112.

As depicted in FIG. 2, NEs $112_2$ and $112_3$ belong to a hierarchical level, with CS 102 forming a hierarchical level above NEs $112_2$ and $112_3$, and NEs $112_4$, $112_5$, $112_6$, and $112_7$ forming a hierarchical level below NEs $112_2$ and $112_3$. The NEs $112_4$, $112_5$, $112_6$, and $112_7$ belong to a hierarchical level, with NEs $112_2$ and $112_3$ forming a hierarchical level above NEs $112_4$, $112_5$, $112_6$, and $112_7$, and STs 120 forming a hierarchical level below NEs $112_4$, $112_5$, $112_6$, and $112_7$. Although depicted and described with respect to a specific hierarchy of communication network 200, since NEs 112 of CDN 110 form at least a semi-mesh network (as depicted and described herein with respect to FIG. 1), communication network 200 may be configured to support various other hierarchies, a superposition of multiple hierarchies, and the like, as well as various combinations thereof.

As depicted in FIG. 2, a set of content channels is available from CS 102, where each content channel is adapted for conveying content toward STs 120 using appropriate streaming technology (e.g., using IP data streams). In one embodiment, content channels available from CS 102 may be distributed to NEs 112 for delivery to STs 120 using multicast streams, which may be established, modified, terminated, and similarly controlled, using various multicast capabilities. The CS 102 and NEs 112 cooperate to transport content channels available from CS 102 as close as possible to STs 120 before forming individual content streams for conveying the content to STs 120, thereby reducing consumption of network resources by content channels, as well as reducing delay experienced as a result of content channel change requests.

As described herein, a set of content channels is available from CS 102. A subset of the content channels available from CS 102 is provided to an NE 112 in response to a request from the NE 112 for the subset of content channels. Since content channels are provided downstream from CS 102 in a hierarchical manner, a content channel is only available from an NE 112 in a first hierarchal layer if that content channel is available from an NE 112 in a second hierarchical layer that is above the first hierarchical layer. In such a hierarchical distribution network, requests for content channels flow upstream toward CS 102 until such content channel requests reach an NE 112 (or CS 102) from which the requested content channel is available.

For example, assume that a set of content channels available from CS 102 includes five content channels, A, B, C, D, and E. In this example, assume that content channels A, B, and C are provided to NE $112_2$. In this example, a request by NE $112_4$ for content channel C can be served by NE $112_2$, however, a request by NE $112_4$ for content channel D must be forwarded from NE $112_2$ to CS 102. In this example, assume that channels B, C, D, and E are provided to NE $112_3$. In this example, a request by NE $112_7$ for content channel C can be served by NE $112_3$, however, a request by NE $112_4$ for content channel A must be forwarded from NE $112_3$ to CS 102. The distribution of content channels in communication network 200 may be better understood with respect to the exemplary content channels depicted in FIG. 2.

As depicted in FIG. 2, a content channel 202 (conveying associated content, such as a streaming broadcast television program, a streaming broadcast radio program, SW patches, and the like, as well as various combinations thereof) is provided from CS 102 to NE $112_2$. The content channel 202 is provided from NE $112_2$ to NE $112_5$ such that content channel 202 is available from CS 102, NE $112_2$, and NE $112_5$, however, assume that content channel 202 is not initially provided from NE $112_2$ to NE $112_4$. As depicted in FIG. 2, assuming that ST $120_2$ requests content channel 202 from NE $112_5$ while content channel 202 is available from NE $112_5$, NE $112_5$ may serve the request from ST $120_2$, streaming the content associated with content channel 202 to ST $120_2$ for delivery to one or more users associated with ST $120_2$.

With respect to content channel 202, further assuming that ST $120_2$ requests content channel 202 from NE $112_4$, since content channel 202 is now available from NE $112_5$, NE $112_5$ serves the request without having to forward the request for content channel 202 to NE $112_2$. With respect to content channel 202, further assuming that ST $120_1$ requests content channel 202 from NE $112_4$, since content channel 202 is not currently available from NE $112_4$, NE $112_4$ forwards the request for content channel 202 to NE $112_2$, which serves the request. In other words, once a content channel is provided to an NE 112 for distribution to one ST 120, other STs 120 requesting that content channel from that NE 112 may be served by that NE 112 (without requiring upstream requests to NEs 112 at higher layers in the hierarchy).

As depicted in FIG. 2, a content channel 204 (conveying associated content, such as a streaming broadcast television program, a streaming broadcast radio program, and the like, as well as various combinations thereof) is provided from CS 102 to NE $112_3$. The content channel 204 is provided from NE $112_3$ to NEs $112_6$ and $112_7$ such that content channel 202 is available from CS 102, NE $112_3$, NE $112_6$, and NE $112_7$. As depicted in FIG. 2, assuming that STs $120_4$ and $120_N$ request content channel 204 from NEs $112_6$ and $112_7$, respectively, NEs $112_6$ and $112_7$ may serve the respective requests from STs $120_4$ and $120_N$ (without initiating upstream requests to NE $112_3$ to provide content channel 204). The NEs $112_6$ and $112_7$ stream the content associated with content channel 204 to STs $120_4$ and $120_N$ for presentation to one or more users associated with each of STs $120_4$ and $120_N$.

From discussions of content channels 202 and 204 herein, various benefits of providing content channels originating from CS 102 as close as possible to STs 120 become clear. Since content channel 202 was provided from NE $112_2$ to NE $112_5$ prior to a request from ST $120_2$ for content channel 202, ST $120_2$ was served by NE $112_5$ rather than NE $112_2$ (which would have required transmission of content channel 202 over multiple links), thereby reducing network resources consumed in serving the request from ST $120_2$. Since requests from STs $120_4$ and $120_N$ for content channel 204 were served by NEs $112_6$ and $112_7$ to which STs $120_4$ and $120_N$ are directly connected, while the request from ST $120_2$ for content stream 202 was served by NE $112_2$ (i.e., the request was forwarded from to NE $112_2$ since content channel 202 was not available from NE $112_5$), channel selection delay experienced by users of STs $120_4$ and $120_N$ is less than that experienced by users ST $120_2$.

In continuation of this discussion, since serving requests for content channels from channel selection points as close as possible to the subscriber terminals is beneficial, optimizing the subset of channels (selected from a set of channels available from the content server) that are available at channel selection points is beneficial, since such optimization increases the likelihood that content channels requested by subscriber terminals are served from channel selection points close to the subscribers (rather than being forwarded upstream to channel selection points farther away from the subscribers). The present invention enables optimization of a subset of channels available at a given channel selection point. The operation of an NEs 112 in selecting a subset of channels available from that NEs 112 may be better understood with respect to FIG. 3.

Similarly, with respect to broader applications of the present invention, since serving requests for any content from content selection points (i.e., not just serving requests for channels from channel selection points in an IPTV broadcast television network) as close as possible to the subscriber terminals is beneficial, optimizing the subset of content (e.g., content channels (e.g., streaming video or audio channels), content objects (e.g., content-on-demand (e.g., video-on-demand, audio-on-demand, and the like), data files, software patches, and the like), and the like, as well as various combinations thereof) available at content selection points is beneficial because such optimization increases the likelihood that content requested by subscriber terminals is served from content selection points close to the subscribers (rather than being forwarded upstream to content selection points farther away from the subscribers). In other words, the present invention enables optimization of the subset of content items (or, more broadly, content or information) available at a given content selection point (or, more broadly, content distribution point or information distribution point).

Furthermore, although omitted from FIG. 2 for purposes of clarity, NEs 112 in different branches of the hierarchy (at the same level, as well as different levels, of the hierarchy) may communicate for purposes of sharing forecast information (e.g., channel forecast information) adapted for use by each NE in selecting a subset of content (e.g., content channels, content objects, and like content items) available from CS 102. For example, although communication between NEs $112_5$ and $112_6$ is omitted in communication network 200 (since communication network 200 is a hierarchical representation of communication network 100, a mesh network), NEs $112_5$ and $112_6$ may communicate for purposes of exchanging channel forecast information. The operation of an NE 112 in obtaining channel forecast information from other NEs 112 and STs 120 may be better understood with respect to FIG. 3.

Figure 3:
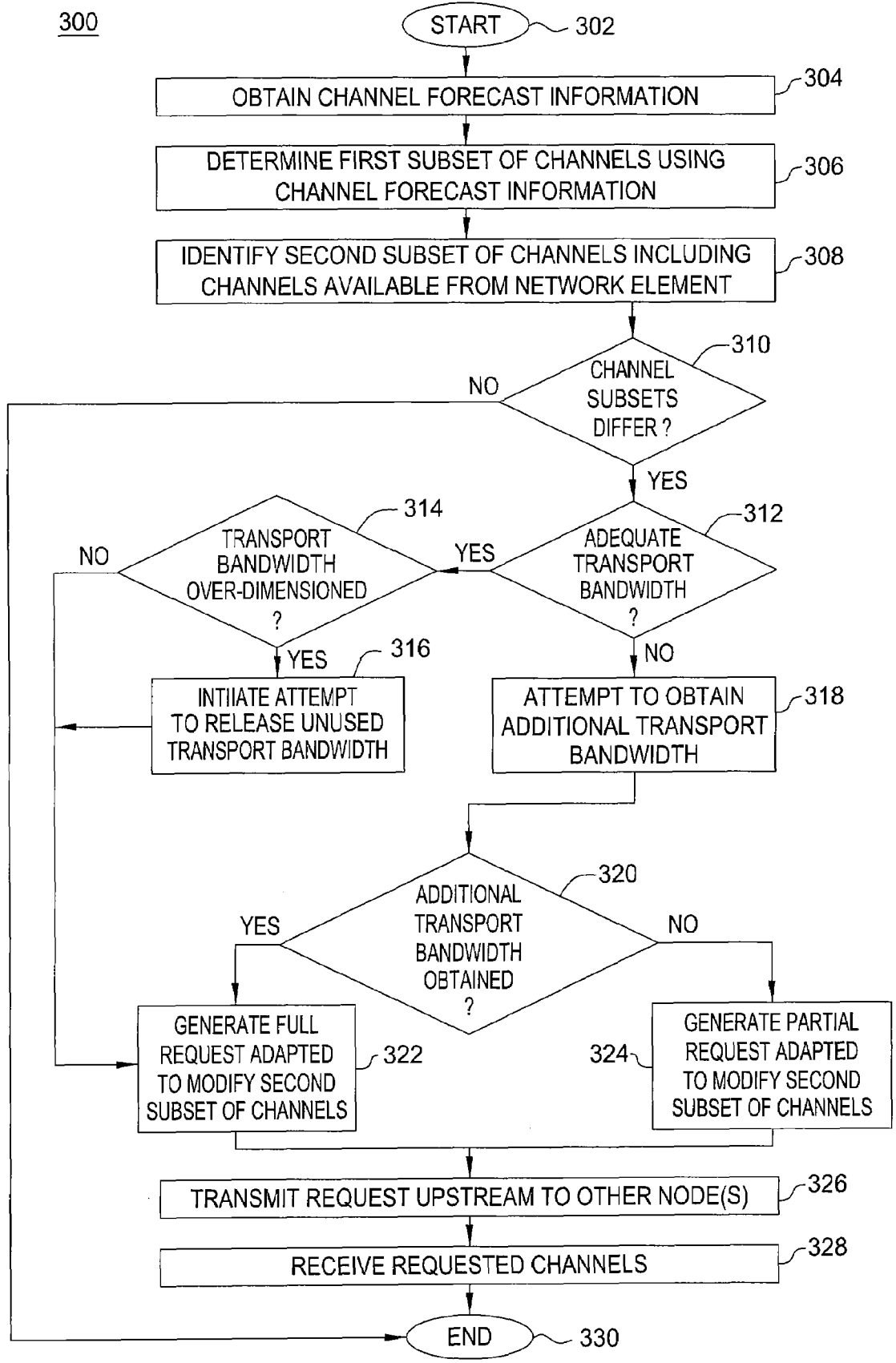
FIG. 3 depicts a method according to one embodiment of the present invention.

FIG. 3 depicts a method according to one embodiment of the present invention. Specifically, method 300 includes a method for enabling a network element (illustratively, a content channel selection point) to determine a subset of channels available from a content server which should be made available from that network element. Although primarily depicted and described with respect to a content channel selection point and associated content channels, method 300 may be more broadly applied for enabling a content selection point (which may be more generally referred to herein as a content distribution point or information distribution point) to determine a subset of content available from a content server. Although primarily depicted and described herein as being performed serially, at least a portion of the steps of method 300 may be performed contemporaneously, or in a different order than presented in FIG. 3. The method 300 begins at step 302 and proceeds to step 304.

At step 304, channel forecast information is received. The channel forecast information is received by a channel selection point (illustratively, one of NEs 112). In one embodiment, a channel selection point may automatically receive various forms of channel forecast information, or other information which may be processed by the channel selection point to produce associated channel forecast information. In one embodiment, a channel selection point may request various forms of channel forecast information from various other network elements (e.g., subscriber terminals, other channel selection points, other network elements and the like, as well as various combinations thereof).

As described herein, the channel selection point processes the channel forecast information in order to determine a set of content channels which should be made available at the channel selection point. The set of channels which should be made available at the channel selection point includes a subset of channels available from one or more content servers (illustratively, content server 102). The channel forecast information (including sources of channel forecast information, types of channel forecast information, and the like, as well as various combinations thereof) is described in additional detail below.

In one embodiment, channel forecast information may be obtained locally from the channel selection point (i.e., from the channel selection point for which the channel subsets are determined). In one embodiment, at least a portion of the channel forecast information obtained locally from the channel selection point includes channel forecast information received and stored by the channel selection point (e.g., received from subscriber terminals, channel selection points, management systems, and the like, as well as various combinations thereof, as described herein). In one embodiment, at least a portion of the channel forecast information obtained locally from the channel selection point includes channel forecast information determined locally by the channel selection point (e.g., by processing raw information collected by the channel selection point, raw information received from other network elements and the like, as well as various combinations thereof).

In one embodiment, channel forecast information may be determined locally by the channel selection point using other information collected by the channel selection point. In one embodiment, channel forecast information may be determined by a channel selection point using trend data collected by that channel selection point. In one such embodiment, the trend data collected by the channel selection point for use in determining channel forecast information may include channel selection requests received at the channel selection point (e.g., channel selection requests received from subscriber terminals, other channel selection points, and the like, as well as various combinations thereof). Although described with respect to specific trend data collected and processed by a channel selection point, various other forms of trend data may be collected and processed by a channel selection point to produce channel forecast information.

In one embodiment, channel forecast information may be received at the channel selection point from subscriber terminals associated with the channel selection point. In one embodiment, subscriber terminals transmit channel preference information to the channel selection point (e.g., to the channel selection point with which the subscriber terminal is directly associated, to all channel selection points in the distribution path between each subscriber terminal and the content server, and the like). In one embodiment, a subscriber terminal transmits channel preference information to one or more channel selection points periodically. In one embodiment, a subscriber terminal transmits channel preference information to one or more channel selection points in response to one or more requests for channel preference information.

In one embodiment, channel preference information received from a subscriber terminal includes processed preference information (e.g., channel preference scores, which may be adapted for ranking one or more channels in terms of preference, computed by the subscriber terminal using raw channel preference information collected by the subscriber terminal). In one embodiment, channel preference information received from a subscriber terminal may include (in addition to, or in place of, processed channel preference information) raw channel preference information. In one such embodiment, the channel selection point processes raw channel preference information in order to generate channel preference scores adapted for use as channel forecast information.

In one embodiment, raw channel preference information collected by a subscriber terminal includes one or more sets of user preferences (e.g., "favorite channels" lists) configured by one or more users of the subscriber terminal. In one embodiment, channel preference information collected by a subscriber terminal includes selections made by one or more users of the subscriber terminal. In one such embodiment, such selection information may include channel selection trend data based on, for example, how long users remain tuned to specific channels, the number of times users select specific channels via user interfaces associated with the subscriber terminals, information indicative of programs scheduled by users to be recorded using associated digital video recorders (DVRs), and the like, as well as various combinations thereof. Although described with respect to specific channel selection trend data, various other forms of channel selection trend data may be collected by subscriber terminals for delivery to channel selection points.

In one embodiment, channel forecast information may be received at the channel selection point from one or more other channel selection points. The channel forecast information received by a first channel selection point from a second channel selection point may include information associated with content channels currently available from the second channel selection point, information associated with content channels scheduled to be available from the second channel selection point in the future, portions of the channel forecast information obtained by that second channel selection point, and the like, as well as various combinations thereof. As described herein, channel forecast information obtained by a channel selection points from other channel selection points may be obtained from channel selection at various levels of the network hierarchy.

In one embodiment, channel forecast information may be received at the channel selection point from one or more channel selection points lower in the hierarchy (both within the same branch of the hierarchy, as well as from different branches of the hierarchy). Since channel requests are funneled upstream, a channel selection point which serves requests from other channel selection points lower in the hierarchy may provide valuable information regarding content channels most likely to be requested by the one or more channel selection points lower in the hierarchy. For example, NE $112_2$ may benefit from receiving channel forecast information from NEs $112_4$ and $112_5$ (within the same branch of the hierarchy), as well as from NEs $112_6$ and $112_7$ (in a different branch of the hierarchy).

In one embodiment, channel forecast information may be received at the channel selection point from one or more channel selection points at the same level within the hierarchy (both within the same branch of the hierarchy, as well as from different branches of the hierarchy). Since channel request trends may be similar across geographic regions, channel selection points at the same level within the hierarchy may provide valuable information regarding content channels most likely to be requested by subscriber terminals (or other channel selection points lower in the hierarchy) associated with that channel selection point. For example, NE $112_4$ may benefit from receiving channel forecast information from NEs $112_5$, $112_6$, and $112_7$, NE $112_2$ may benefit from receiving channel forecast information from NE $112_3$, and the like.

For example, assuming NEs $112_5$ and $112_6$ serve subscribers in the Eastern United States, NEs $112_5$ and $112_6$ may detect an unexpectedly large demand for a particular program aired at 8:00 PM Eastern Daylight Time (EDT). In this example, further assuming that NEs $112_2$ and $112_3$ serve subscribers in the Western United States, NEs $112_5$ and $112_6$ may provide (automatically, or in response to respective requests from NEs $112_2$ and $112_3$) forecast information indicative of the unexpected large demand for that program to NEs $112_2$ and $112_3$. In this example, NEs $112_2$ and $112_3$ may then use the forecast information received from NEs $112_5$ and $112_6$, as well as various other forecast information, as described herein, for ensuring that the television channel on which that program aired is available from NEs $112_2$ and $112_3$ at the time at which the program is scheduled to be aired in the Western United States.

In one embodiment, channel forecast information may be received at the channel selection point from one or more other systems associated with the hierarchical content distribution network. In one such embodiment, channel forecast information may be received from one or more management systems associated with the hierarchical content distribution network. For example, channel forecast information may include programming schedules received from a management system, information indicative of demand for specific content channels (e.g., determined by one or more management system in communication with the channel selection points of the content distribution network, entered by one or more administrators via one or more of the management systems, and the like, as well as various combinations thereof).

In addition to the different channel forecast information described hereinabove, other information may be received and processed by a channel selection point in order to determine an optimum subset of content channels. For example, channel forecast information may include television program schedules, local and/or regional characteristics (e.g., static channel preference biases), measured likelihood of channel selection (e.g., over the entire channel selection point, over selected client links associated with the channel selection point, and the like), observed channel selection sets (e.g., over different dates and times), channel selection probabilities, thresholds employed by other channel selection points for selecting efficient network paths, and the like, as well as various combinations thereof.

In one embodiment, channel forecast information may be used to create channel forecast history profiles. For example, a channel forecast history profile may be created for a particular time period (e.g., 8:00 PM-9:00 PM EST on a day-by-day basis, 8:00 PM-9:00 PM EST on Tuesdays, 1:00 PM-3:00 PM on the second Wednesday of each month, and the like, as well as various combinations thereof). In one embodiment, a new channel forecast history profile may be created using one or more previously created channel forecast history profiles and/or other channel forecast information. In one embodiment, previously created history profiles may be updated using recently collected channel forecast information.

Although primarily described with respect to channel forecast history profiles, since other forecast history profiles may be created (depending on the content that is being distributed), channel forecast history profiles may be more generally referred to as content forecast history profiles. In other words, a content forecast history profile may be a historical profile determined for any of a variety of types of content or information, including content channels (e.g., broadcast video channels or audio channels), content objects (e.g., content-on-demand (e.g., video-on-demand, audio-on-demand, and the like), data files, software patches, and the like), and the like, as well as various combinations thereof.

In one embodiment, channel forecast information may be continuously exchanged and processed by various components of the content distribution network using one or more adaptive learning algorithms. In one embodiment, such adaptive learning algorithms may be adapted to automatically process, analyze, and correlate, various forms of channel forecast information, as well as raw data adapted for being converted into channel forecast information, in order to continuously optimize the subsets of channels available from channel selection points in the content distribution network. In one embodiment, the adaptive learning algorithms may be modified according to at least a portion of the channel forecast information.

At step 306, a first subset of channels is determined using the channel forecast information (which may be alternatively referred to as a determined subset of channels). The first subset of channels includes channels which should be made available at the channel selection point (for distribution to other subscriber terminals, or one or more other channel selection points below that channel selection point in the distribution hierarchy). The number of content channels included in the first subset of channels may be limited by a number of factors, including the capabilities of the channel selection point for which the first subset of channels is determined, the capabilities of the distribution network by which the content channels are provided to the channel selection point, and like factors, as well as various combinations thereof.

In one embodiment, in order to ensure that content channels currently available from the channel selection point continue to be available from the channel selection point following reconfiguration of the channels available from the channel selection point, content channels currently available from the channel selection point may be automatically included within the first subset of channels. In one such embodiment, additional content channels included within the first subset of channels may include any other content channels that are available from one or more content servers which serve that channel selection point.

In one embodiment, the subset of content channels which should be made available at a channel selection point includes channels most likely to be requested by subscriber terminals associated with the channel selection (either directly associated with the channel selection point, or indirectly associated with the channel selection point via one or more other channel selection points disposed between that channel selection point and the subscriber terminals). In one such embodiment, the subset of channels is determined according to the expected demand for each of the channels available from the content server, where the expected demand for each of the channels available from the content server is determined using the channel forecast information.

In one embodiment, an expected demand (or other similar measures or combination of similar measures, such as a probability that a content channel is selected, a number of subscriber terminals expected to request a content channel, and the like, as well as various combinations thereof) is determined for each content channel available to the channel selection point (i.e., for each content channel in the full set of content channels available from content servers serving the network). In one such embodiment, the subset of content channels which should be made available at the channel selection point includes the content channels having the highest expected demand. In this embodiment, the number of content channels selected for inclusion in the subset of channels is equal to (or possibly less than) the number of channels that the channel selection point is capable of supporting.

In one example, assume that five content channels are available from CS 102 (content channels A, B, C, D, and E). In this example, assume that content channel optimization method 300 is being performed by NE $112_5$, and further assume that no channels are currently being requested by subscribers associated with NE $112_5$. Using the channel forecast information, NE $112_5$ may determine that expected demand (e.g., in terms of the number of subscriber terminals expected to request that content channel) for content channels A, B, C, D, and E is 120, 97, 42, 232, and 68, respectively. In this example, assuming that NE $112_5$ is capable of supporting three content channels, the first subset of channels identified by NE $112_5$ would include content channels A, B, and D.

In another example, in which a different measure is used to evaluate content channels for inclusion within the first subset of channels which should be available from NE $112_5$, assume that five content channels are available from CS 102 (content channels A, B, C, D, and E). In this example, assume that content channel optimization method 300 is being performed by NE $112_5$, and assume that two content channels (A and C) are currently being provided to subscribers associated with NE $112_5$. In this example, assume that the content channels are evaluated according to an expected probability that each content channel is requested by one or more subscribers, and that NE $112_5$, using the channel forecast information, computes expected probabilities of 100%, 62%, 100%, 87%, and 45% for content channels A, B, C, D, and E, respectively (where expected probability of 100% for content channels A and C is due to the fact that those two channels are currently being provided to subscriber terminals associated with NE $112_5$). In this example, assuming that NE $112_5$ is capable of supporting three content channels, the first subset of channels identified by NE $112_5$ would include content channels A, C, and D.

In one embodiment, the subset of channels may include the maximum number of channels that the channel selection point is capable of supporting. In other embodiments, the number of channels to include in the subset of channels may be determined in another manner. In one embodiment, for example, a threshold may be established for use in determining the number of content channels to include in the subset of channels (e.g., a threshold with respect to the expected demand, probability of selection, and other similar measures which may be used in evaluating content channels for inclusion in the subset of channels). In this embodiment, the threshold based on measure used in evaluating the content channels for inclusion in the subset of channels may be used in combination with the threshold number of channels that the channel selection point is capable of supporting (e.g., such that if the number of content channels selected for inclusion in the subset of channels does not exceed the capabilities of the channel selection point).

At step 308, a second subset of channels is identified (which may be alternatively referred to as an available subset of channels). The second subset of channels is identified by the channel selection point. In one embodiment, the second subset of channels includes channels currently available from the channel selection point. In one embodiment, a channel is considered available when channel related data frames are received at the channel selection point. In another embodiment, a channel is considered available when channel related data frames are only partially received at the channel selection point. In another embodiment, a channel is considered available when no channel related data frames are received, but a defect indication signals that a defect prevents reception of channel related data frames. Although described with respect to specific conditions which indicate that a channel is considered available, a channel may be considered available under various other conditions.

At step 310, a determination is made as to whether the first subset of channels and the second subset of channels are different. If the first subset of channels and the second subset of channels are not different, the second subset of channels includes each content channel identified in the first subset of channels and, therefore, method 300 proceeds to step 326, where method 300 ends. If the first subset of channels and the second subset of channels are different, the second subset of channels does not include each content channel identified in the first subset of channels and, therefore, method 300 proceeds step 312.

In continuation of the example above in which expected demand is used to evaluate content channels for inclusion in the first subset of channels, the second subset of channels identified by NE $112_5$ would be an empty set (since in the previous example no content channels were currently available from NE $112_5$). In this example, since the second subset of channels does not include any content channels, and the first subset of channels includes content channels A, B, and D, the difference between the first and second subsets of channels includes content channels A, B, and D. The NE $112_5$ may modify the second subset of channels available from NE $112_5$ to include content channels A, B, and D. The process of modifying content channels available from a channel selection point (e.g., NE $112_5$) may be better understood with respect to steps 312-328 of FIG. 3.

In continuation of the example above in which expected probability is used to evaluate content channels for inclusion in the first subset of channels, the second subset of channels identified by NE $112_5$ would include content channels A and C. In this example, since the second subset of channels includes content channels A and C, and the first subset of channels includes content channels A, C, and D, the difference between the first and second subsets of channels includes content channel D. The NE $112_5$ may modify the second subset of channels available from NE $112_5$ to include content channels D (in addition to content channels A and C already available from NE $112_5$). The process of modifying content channels available from a channel selection point (e.g., NE $112_5$) may be better understood with respect to steps 312-328 of FIG. 3.

At step 312, a determination is made as to whether there is adequate transport bandwidth available to the channel selection point (i.e., available to support each of the channels in the first subset of channels, which may include a larger number of channels than the channels included in the second subset of channels including currently available to the channel selection point). If there is not adequate transport bandwidth, method 300 proceeds to step 318, at which point an attempt is made by the channel selection point to obtain additional transport bandwidth, as described herein below. If there is adequate transport bandwidth, method 300 proceeds to step 314.

At step 314, a determination is made as to whether the transport bandwidth available to the channel selection point (i.e., available to support each of the channels in the second subset of channels) is over-dimensioned (i.e., there is excess transport bandwidth not required to support the channels in the second subset of channels). If the transport bandwidth available to the channel selection point is not over-dimensioned, method 300 proceeds to step 322, at which point a full request adapted to modify the second subset of channels is generated. If the transport bandwidth available to the channel selection point is not over-dimensioned, method 300 proceeds to step 316.

At step 316, an attempt to release unused transport bandwidth is initiated by the channel selection point. In one embodiment, the attempt to release unused transport bandwidth is made by initiating a request to one or more systems (e.g., one or more management systems) adapted for reducing bandwidth available to the channel selection point. From step 316, method 300 proceeds to step 322, at which point a full request adapted to modify the second subset of channels is generated. Although initiation of the attempt to release the unused transport bandwidth is depicted as being initiated prior to generation of the request to modify the second subset of channels, since modification of the second subset of channels is not dependent on the release of the unused transport bandwidth, in other embodiments the channel selection point may initiate the request to decrease the transport bandwidth in parallel with (or even potentially after) generating and initiating the request to modify the second subset of channels.

At step 318, an attempt is made to obtain additional transport bandwidth (i.e., to increase the amount of transport bandwidth available to the channel selection point to enable the channel selection point to receive all of the channels identified in the first subset of channels, which may include more channels than are identified in the second subset of channels currently available from the channel selection point). In one embodiment, the attempt to obtain additional transport bandwidth is made by initiating a request to one or more systems (e.g., one or more management systems) adapted for allocating additional bandwidth in support of additional content channels. From step 318, method 300 proceeds to step 320.

At step 320, a determination is made as to whether the additional transport bandwidth is obtained. If additional transport bandwidth is obtained, method 300 proceeds to step 322, at which point a full request adapted to modify the second subset of channels is generated. Since the required bandwidth has been obtained, the full request includes a request for all content channels identified in the first subset of channels that are not in the second subset of channels. If additional transport bandwidth is not obtained, method 300 proceeds to step 324, at which point a partial request adapted to modify the second subset of channels may be generated. Since the required bandwidth has not been obtained, the partial request includes a request for a portion of the content channels identified in the first subset of channels that are not in the second subset of channels. From steps 322 and 324, method 300 proceeds to step 326.

The request adapted to modify the second subset of channels (i.e., a "full" request if the necessary bandwidth is available to the channel selection point; a "partial" request if only a portion of the necessary bandwidth is available to the channel selection point) is generated by the channel selection point. The request is intended for an upstream channel selection point (or, ultimately, a content server if the content server is the parent of that channel selection point). As described herein, the request may include a request to add one or more content channels to the list of content channels currently being provided to the channel selection point (i.e., to modify the second subset of channels currently available from the channel selection point).

For example, assume that a channel selection point currently supports four channels (A, B, C, and D) having an average data rate of 10 Mbps each, such that 40 Mbps is available and in use at the channel section point using an STS1 transport container having 50 Mbps capacity. If the first subset of channels (determined using channel forecast information) indicates that channels E, F, G, H, and I (also having an average data rate of 10 Mbps each) should also be available from that channel selection point (in addition to channels A, B, C, and D), while additional channel E can be supported by the spare 10 Mbps capacity in the existing STS1 transport container, the channel selection point may request that a second 50 Mbps STS1 transport container be provisioned to support additional channels F, G, H, and I.

In continuation of this example, assuming that the channel selection point initiates a request for the second STS1 container, e.g., to a DSLAM associated with the channel selection point, the DSLAM may or may not be able to provide the requested STS1 transport container. If the DSLAM can provide the second STST1 container, the channel selection point will generate a request for the full set of additional channels, i.e., channels E, F, G, H, and I (i.e., referred to as a "full" request). If the DSLAM cannot provide the second STST1 container, the channel selection point will generate a request for a portion of the additional channels that can be supported by the existing STS1 transport container, i.e., a request for one of channels E, F, G, H, and I (i.e., referred to as a "partial" request) since only one additional channel can be supported by the existing STS1 transport container. The channel selection point may request the additional channel or channels as described herein with respect to steps 326 and 328.

Although primarily depicted and described herein with respect to embodiments in which: (1) the existing bandwidth is adequate to support each of the additional channels, (2) additional bandwidth is obtained such that each of the additional channels may be supported, or (3) the existing bandwidth is adequate to support at least one of the additional channels (where additional bandwidth cannot be immediately obtained by the channel selection point), in an embodiment in which existing bandwidth is inadequate to support even one additional channel and additional bandwidth cannot be obtained by the channel selection point, no request adapted to modify the second subset of channels is generated by the channel selection point (i.e., method 300 ends without a request being generated and transmitted).

At step 326, the generated request (i.e., either a "full" request or a "partial" request) is transmitted upstream to at least one other node. The at least one other node may include one or more channel selection points upstream from that channel selection point or one or more content servers (if that channel selection point is adjacent to the one or more content servers in the distribution hierarchy). As described herein, if the request cannot be served by the first channel selection point at which the request is received, that first channel selection point will forward the request upstream to another channel selection point, and so on, until the request reaches a channel selection point (or content server) which is capable of serving the request.

At step 328, the requested content channel(s), as specified in the generated request, is received at the channel selection point. Upon being received at the channel selection point which generated and transmitted the request, the requested content channel(s) becomes available at that channel selection point for serving requests (e.g., requests from subscriber terminals and, possibly, other channel selection points, depending on the position of that channel selection point within the hierarchy). Furthermore, if the request included a request that one or more content channels be dropped, the dropped content channel(s) are not longer available from that channel selection point for responding to requests. At step 330, method 300 ends.

Although described with respect to a single request, multiple requests may be generated and transmitted by a content selection point (e.g., by the channel selection point described herein with respect to FIG. 3). In one embodiment, multiple requests may be generated for transmission to a single upstream node (i.e., channel selection point or content server). In one embodiment, multiple requests may be generated for transmission to one or more upstream nodes (i.e., one or more channel selection points, one or more content servers, and the like, as well as various combinations thereof).

Although described with respect to an embodiment in which additional transport bandwidth is requested as required, in other embodiments a content selection/distribution point (e.g., the channel selection point described herein with respect to FIG. 3) may evaluate which content (e.g., content channels, content objects, and like content items or other information, depending on the application of the present invention) should be made available from the content selection point prior to a time at which additional bandwidth may be made available in support of distributing additional content. In such embodiments, rather than provisioning additional transport bandwidth on-the-fly, the additional transport bandwidth may be scheduled to be made available in the future. After the additional transport bandwidth is available, the content selection point may request channel streaming as depicted and described herein.

Although not described with respect to time periods for which content forecasts may be performed, the present invention may be used to determine a subset of content (e.g., content channels, content objects, and like content items or other information, depending on the application of the present invention) to be made available at a content selection point for any time period. In one embodiment, the present invention may be used to perform real-time optimization of a subset of content available from a content selection point. In one embodiment, the present invention may be used for scheduling future subsets of content to be made available from a content selection point as a future time. The time period for which a content schedule is determined may be any period of time, such as a second, a minute, an hour, a day, a week, a month, and the like, as well as various combinations thereof.

As described herein, the present invention may be used for real time optimization of a subset of content (e.g., content channels, content objects, and like content items) available from a channel selection point. In this embodiment, steps 310-328 may be performed immediately following steps 304, 306, and 308. In this manner, the content selection point may be modified (e.g., using one or more requests to upstream content selection points) so that the set of content determined to be optimal at the present time becomes available from the content selection point at the present time. For example, content selection optimization algorithm 300 may be performed once per second, once per minute, once per hour, once per day, once per week, once per month, and the like.

As described herein, the present invention may be used for scheduling future subsets of content channels made available from a channel selection point. In this embodiment, steps 310-324 may be scheduled to be performed some time later than steps 304, 306, and 308. In this manner, the channel selection point may be modified (e.g., using one or more requests to upstream channel selection points) so that the set of content channels considered to be optimal during a future time period become available from that channel selection point during that future time period. The future time period may be any length of time, such as an hour, a day, a week, a month, and the like, as well as various combinations thereof.

Although primarily described with respect to determining a subset of content to be made available at a single content selection point, content selection optimization algorithm 300 may be performed multiple content selection points in a hierarchical content distribution network such that communications between content selection points with respect to content forecast information, available/scheduled content information, and the like, as well as various combinations thereof, may be performed in a manner tending to operate the hierarchical content distribution network as a form of self-optimizing neural network, thereby resulting in continuous optimization of content availability across the hierarchical content distribution network.

Although primarily depicted and described herein as being performed by network element within the content distribution hierarchy (i.e., content channel selection points such as NEs 112), in other embodiments, various functions depicted and described herein as being performed by network elements within the hierarchal content distribution network may be performed by one or more management systems associated with the hierarchal content distribution network. In one such embodiment, a management system may use content forecast information to determine the subset of content which should be made available at respective network elements within the hierarchal content distribution network. In this embodiment, the management system may distribute the determined subsets of content (e.g., content channels, content objects, and like content items) to the respective network elements, thereby enabling the network elements to request the identified content from other network elements, as described herein.

Although primarily depicted and described herein with respect to streaming broadcast content (e.g., broadcast audio streams, broadcast IPTV video streams, and like streaming content), in other embodiments the present invention may be used to provide improved distribution and availability of other types of information, including partially streaming content (e.g., content streamed from a server to a network buffer and streamed from the network buffer to subscribers such that the read time at which the data enters the network buffer is different than the write time at which the data leaves the network buffer, such as IPTV video-on-demand content), non-streaming content (e.g., data files, software patches, and other content objects), and the like, as well as various combinations thereof. The present invention may be used to control availability of any type of information at any network elements within any type of network.

In one embodiment, providing improved distribution of other types of information may include a method for controlling information available from an content distribution node (which may be more generally referred to as an information distribution node/point) located at a first hierarchical level of a network, including determining a subset of content objects using content forecast information, comparing the determined subset of content objects to a plurality of content objects available to the network element located at the first hierarchical level, generating a request adapted for modifying the available content objects in response to a difference between the determined and available subsets of objects, and propagating the request toward a network element located at a second hierarchical level in the content distribution network, wherein the first and second hierarchical levels are different. The content objects (or, more generally, information objects) may include any non-streaming content (e.g., data files, software patches, and the like, as well as various combinations thereof).

In one such embodiment of providing improved distribution of other types of information (i.e., other than broadcast IPTV content streams), for example, by determining which of a plurality of software patches (e.g., a Microsoft WINDOWS XP software patch, a Microsoft WINDOWS 2000 software patch, and the like) are most likely to be requested or required by different subscribers (using software patch forecast information), those software patches most likely to be requested or required by the subscribers may be distributed to content selection points (which may alternatively be referred to herein in this context as information distribution points) closest to the subscribers. Although primarily described with respect to software patches, various other types of information may be distributed using the present invention.

As described herein, the present invention provides improvements to existing information distribution networks. The present invention increases user satisfaction since requests for channels may be served with a higher probability of success and reduced delay. The present invention increases network efficiency and stability because fewer channel requests must be forwarded upstream to channel selection points higher in the content distribution hierarchy, and channel requests initiated by the channel selection points according to the channel forecast information may be initiated in advance of the actual time when such channels are requested by subscriber terminals. Furthermore, the present invention produces optimized distribution of content channels on all geographic scales.

Figure 4:
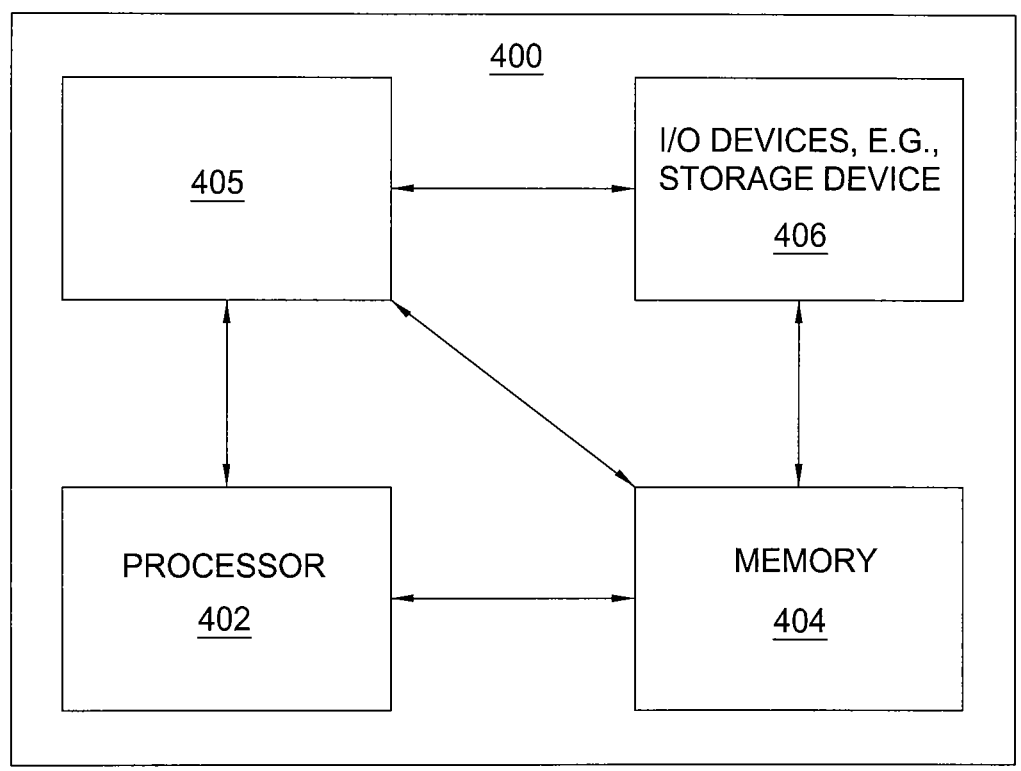
FIG. 4 depicts a high-level block diagram of a general-purpose computer suitable for use in performing at least a portion of the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a content channel evaluation module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

The present invention may be implemented in software and/or in a combination of software and hardware, e.g., using application specific integrated circuits (ASIC), a general purpose computer or any other hardware equivalents. In one embodiment, the present content channel evaluation module or process 405 can be loaded into memory 404 and executed by processor 402 to implement the functions as discussed above. Thus, content channel evaluation process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for controlling content channels available at a first network element located at a first hierarchical level in a content distribution network, comprising:

determining, for the first network element located at the first hierarchical level using content channel forecast information associated with a set of devices served by the first network element located at the first hierarchical level, a subset of content channels from a set of content channels of a content server of the content distribution network;

determining an available subset of content channels available to the first network element located at the first hierarchical level for responding to requests for content channels from ones of the devices served by the first network element located at the first hierarchical level;

comparing the determined subset of content channels to the available subset of content channels to determine whether there is a difference between the determined and available subsets of content channels;

in response to a difference between the determined and available subsets of content channels, generating a request adapted for modifying the available subset of content channels based on determined subset of content channels;

propagating the request toward a second network element located at a second hierarchical level in the content distribution network, wherein the first and second hierarchical levels are different;

requesting additional transport bandwidth in response to a determination that transport bandwidth available to support the determined subset of content channels is inadequate;

determining, based on information on availability of additional transport bandwidth, whether to generate a full request for content channels or a partial request for content channels, the full request for content channels identifying each of the content channels included in the determined subset of content channels that are not included in the available subset of content channels, the partial request for content channels identifying a portion of the content channels included in the determined subset of content channels that are not included in the available subset of content channels; and in response to the additional transport bandwidth being provided, generating the full request for content channels; or in response to the additional transport bandwidth being unavailable, generating the partial request for content channels.

2. The method of claim 1, wherein the content channel forecast information comprises at least one channel forecast history profile.

3. The method of claim 1, wherein at least a portion of the content channel forecast information is determined using a learning algorithm.

4. The method of claim 1, wherein at least a portion of the content channel forecast information is received from a management system.

5. The method of claim 1, wherein the set of devices served by the first network element located at the first hierarchical level comprises a plurality of subscriber terminals, wherein at least a portion of the content channel forecast information is at least one of received from the plurality of subscriber terminals or determined from trend information received from the plurality of subscriber terminals.

6. The method of claim 1, wherein determining the subset of content channels comprises:

computing, using the content channel forecast information, a respective score for at least a portion of the content channels of the set of content channels of the content server of the content distribution network; and selecting, using the computed scores, at least one of the content channels of the set of content channels of the content server of the content distribution network.

7. The method of claim 1, further comprising:

requesting release of unused transport bandwidth in response to a determination that transport bandwidth available to support the content channels in the determined subset of content channels is over-dimensioned.

8. The method of claim 1, further comprising:

receiving, from the second network element located at the second hierarchical level, at least one of the content channels in the determined subset of content channels.

9. An apparatus for controlling content channels available at a first network element located at a first hierarchical level in a content distribution network, comprising:

a processor and a memory communicatively connected to the processor, the processor configured to:

determine, for the first network element located at the first hierarchical level using content channel forecast information associated with a set of devices served by the first network element located at the first hierarchical level, a subset of content channels from a set of content channels of a content server of the content distribution network;

determining an available subset of content channels available to the first network element located at the first hierarchical level for responding to requests for content channels from ones of the devices served by the first network element located at the first hierarchical level;

compare the determined subset of content channels to the available subset of content channels to determine whether there is a difference between the determined and available subsets of content channels;

in response to a difference between the determined and available subsets of content channels, generate a request adapted for modifying the available subset of content channels based on determined subset of content channels;

propagate the request toward a second network element located at a second hierarchical level in the content distribution network, wherein the first and second hierarchical levels are different;

request additional transport bandwidth in response to a determination that transport bandwidth available to support the determined subset of content channels is inadequate;

determine, based on information on availability of additional transport bandwidth, whether to generate a full request for content channels or a partial request for content channels, the full request for content channels identifying each of the content channels included in the determined subset of content channels that are not included in the available subset of content channels, the partial request for content channels identifying a portion of the content channels included in the determined subset of content channels that are not included in the available subset of content channels; and in response to the additional transport bandwidth being provided, generate the full request for content channels; or in response to the additional transport bandwidth being unavailable, generate the partial request for content channels.

10. The apparatus of claim 9, wherein the content channel forecast information comprises at least one channel forecast history profile.

11. The apparatus of claim 9, wherein at least a portion of the content channel forecast information is determined using a learning algorithm.

12. The apparatus of claim 9, wherein at least a portion of the content channel forecast information is received from a management system.

13. The apparatus of claim 9, wherein the set of devices served by the first network element located at the first hierarchical level comprises a plurality of subscriber terminals, wherein at least a portion of the content channel forecast information is at least one of received from the plurality of subscriber terminals or determined from trend information received from the plurality of subscriber terminals.

14. The apparatus of claim 9, wherein, to determine the subset of content channels, the processor is configured to:

compute, using the content channel forecast information, a respective score for at least a portion of the content channels of the set of content channels of the content server of the content distribution network; and select, using the computed scores, at least one of the content channels of the set of content channels of the content server of the content distribution network.

15. The apparatus of claim 9, wherein the processor is further configured to:

request release of unused transport bandwidth in response to a determination that transport bandwidth available to support the content channels in the determined subset of content channels is over-dimensioned.

16. The apparatus of claim 9, wherein the processor is further configured to:

receive, from the second network element located at the second hierarchical level, at least one of the content channels in the determined subset of content channels.

17. A non-transitory computer-readable storage medium storing instructions which, when executed by a computer, cause the computer to perform a method for controlling content channels available at a first network element located at a first hierarchical level in a content distribution network, the method comprising:

determining, for the first network element located at the first hierarchical level using content channel forecast information associated with a set of devices served by the first network element located at the first hierarchical level, a subset of content channels from a set of content channels of a content server of the content distribution network;

determining an available subset of content channels available to the first network element located at the first hierarchical level for responding to requests for content channels from ones of the devices served by the first network element located at the first hierarchical level;

comparing the determined subset of content channels to the available subset of content channels to determine whether there is a difference between the determined and available subsets of content channels;

in response to a difference between the determined and available subsets of content channels, generating a request adapted for modifying the available subset of content channels based on determined subset of content channels;

propagating the request toward a second network element located at a second hierarchical level in the content distribution network, wherein the first and second hierarchical levels are different;

requesting additional transport bandwidth in response to a determination that transport bandwidth available to support the determined subset of content channels is inadequate;

determining, based on information on availability of additional transport bandwidth, whether to generate a full request for content channels or a partial request for content channels, the full request for content channels identifying each of the content channels included in the determined subset of content channels that are not included in the available subset of content channels, the partial request for content channels identifying a portion of the content channels included in the determined subset of content channels that are not included in the available subset of content channels; and in response to the additional transport bandwidth being provided, generating the full request for content channels; or in response to the additional transport bandwidth being unavailable, generating the partial request for content channels.

18. The non-transitory computer-readable storage medium of claim 17, wherein the content channel forecast information comprises at least one channel forecast history profile.

19. The non-transitory computer-readable storage medium of claim 17, wherein at least a portion of the content channel forecast information is determined using a learning algorithm.

20. The non-transitory computer-readable storage medium of claim 17, wherein at least a portion of the content channel forecast information is received from a management system.

21. The non-transitory computer-readable storage medium of claim 17, wherein the set of devices served by the first network element located at the first hierarchical level comprises a plurality of subscriber terminals, wherein at least a portion of the channel forecast information is at least one of received from the plurality of subscriber terminals or determined from trend information received from the plurality of subscriber terminals.

22. The non-transitory computer-readable storage medium of claim 17, wherein determining the subset of content channels comprises:

computing, using the content channel forecast information, a respective score for at least a portion of the content channels of the set of content channels of the content server of the content distribution network; and selecting, using the computed scores, at least one of the content channels of the set of content channels of the content server of the content distribution network.

23. The non-transitory computer-readable storage medium of claim 17, the method further comprising:

requesting release of unused transport bandwidth in response to a determination that transport bandwidth available to support the content channels in the determined subset of content channels is over-dimensioned.

24. The non-transitory computer-readable storage medium of claim 17, the method further comprising:

receiving, from the second network element located at the second hierarchical level, at least one of the content channels in the determined subset of content channels.

* * * * *